H. C. SCHIELD.
FISH HOOK.
APPLICATION FILED JULY 21, 1910.

979,891.

Patented Dec. 27, 1910.

Witnesses
Stuart Hilder.
Frances M. Anderson.

Inventor
Henry C. Schield
by E. W. Anderson & Son
his Attorneys

UNITED STATES PATENT OFFICE.

HENRY C. SCHIELD, OF MERRILL, WISCONSIN.

FISH-HOOK.

979,891.  Specification of Letters Patent. Patented Dec. 27, 1910.

Application filed July 21, 1910. Serial No. 573,133.

*To all whom it may concern:*

Be it known that I, HENRY C. SCHIELD, a citizen of the United States, resident of Merrill, in the county of Lincoln and State of Wisconsin, have made a certain new and useful Invention in Fish-Hooks; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1:
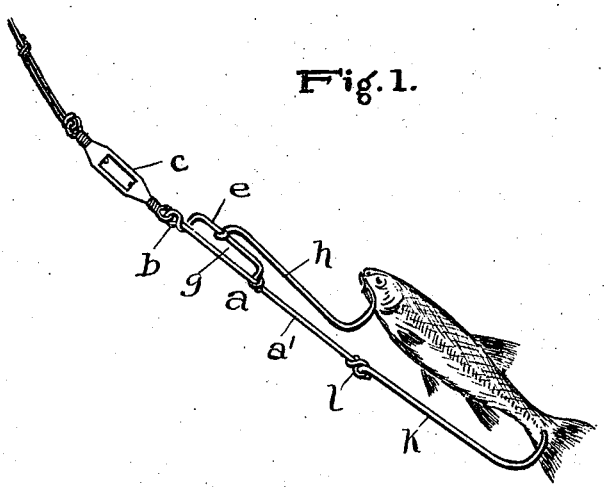
Figure 2:
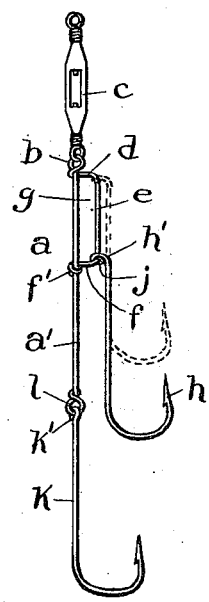
Figure 3:
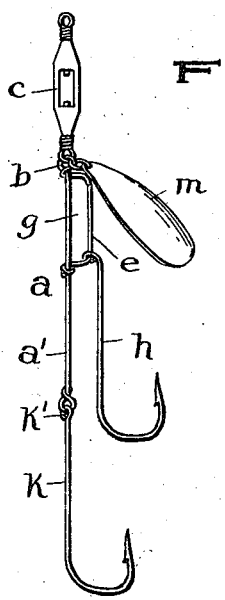

Figure 1 is a side view of my invention as in use. Fig. 2 is a side view of the invention showing the upper hook in raised position in dotted lines. Fig. 3 is a similar view showing a spoon bait attachment.

The invention has relation to fish hooks, having for its object to provide improved means to keep the minnow or frog used as bait in a natural straight position and to prevent the bait from being severed or bitten in halves by the fish, whereby the bait will last longer.

Other objects and advantages will hereinafter appear.

The invention consists in the novel construction and combinations of parts, as hereinafter set forth.

In the accompanying drawings, illustrating the invention, the letter $a$, designates the carrier for my hooks, two of which are used, one above the other in a tandem arrangement, this carrier consisting of a straight wire or rod shank $a'$, reversely bent upon itself at the upper end to form an eye $b$, for engagement with the swivel attachment $c$, having connection with the line in the usual manner. The wire of the carrier after being bent to form the eye as stated is extended outward horizontally at right angles as shown at $d$, then downward at $e$, parallel with the straight vertical shank of the carrier and then inward at right angles at $f$, and bent around the carrier shank as shown at $f'$, forming a loop $g$, which as shown and preferred is a little less than half the length of said shank.

An upper hook $h$, is bent at right angles at its upper end at $h'$, to form a horizontal eye $j$, having slidable engagement with the vertical loop branch $e$, and normally hangs at the lower end of the loop $g$, resting upon the lower horizontal loop branch $f$. A lower hook $k$, has an eye $k'$, at its upper end engaging an eye $l$, at the lower end of the shank of the carrier wire, said wire being turned upon itself to form such eye.

The upper and lower right angle bends of the loop $g$, are comparatively short compared with the length of said loop, whereby the upper hook is hung close to the shank of the carrier wire, the portion of this shank below the loop $g$ being preferably about the same length as that of said hook. The two hooks are thereby always held separated from each other by a distance about equal to the length of a hook, and inasmuch as the upper hook may have slidable movement upon the longer vertical branch $e$, of the loop, this distance separating the two hooks may be increased to the extent of the length of the loop, according to the size or character of the bait or the parts thereof with which the hooks are best engaged. If desired a spoon bait $m$, may be hung from the carrier wire above the upper hook.

In use the bait is securely held in a natural position by the two hooks, and it will be impossible for the fish to sever the bait without becoming caught upon one or both of the hooks.

Having thus described my invention, what I claim as new and desire to secure by Letters Patent is:

1. In a fish hook, a carrier wire having at its upper end an eye for a line connection, at its lower end an eye, and an outward bent portion constituting a support for a second hook located intermediately of and separated from the upper and lower eyes and separated from the upper eye by a substantial portion of the length of the carrier wire, a hook suspended from the lower eye, and an upper hook provided with an integral angularly bent eye having slidable engagement with the upper portion of the carrier wire for engagement with bait of varying lengths and engagement at the lower limit of its movement with said support.

2. In a fish hook, a carrier wire having at its upper end an eye for a line connection, at its lower end an eye, and below and adjacent to said upper eye an outward bent loop having a longitudinal portion parallel to the carrier wire and of a length equal to at least one-third of that of the carrier wire and a lower transverse portion constituting a hook support and located intermediately of and separated from the upper and lower eyes, a hook suspended from the lower eye, and an upper hook having an integral angularly bent eye having slidable engagement with the longitudinal portion of said loop for engagement with bait of varying lengths and engagement at the lower limit of its movement with the lower transverse portion of said loop.

In testimony whereof I affix my signature, in presence of two witnesses.

HENRY C. SCHIELD.

Witnesses:
 FREDA M. JOHANNES,
 T. M. KUBASTA.